J. BASIL AND F. GIRARDI.
TROLLEY SIGNAL.
APPLICATION FILED FEB. 17, 1919.
1,342,579.
Patented June 8, 1920.
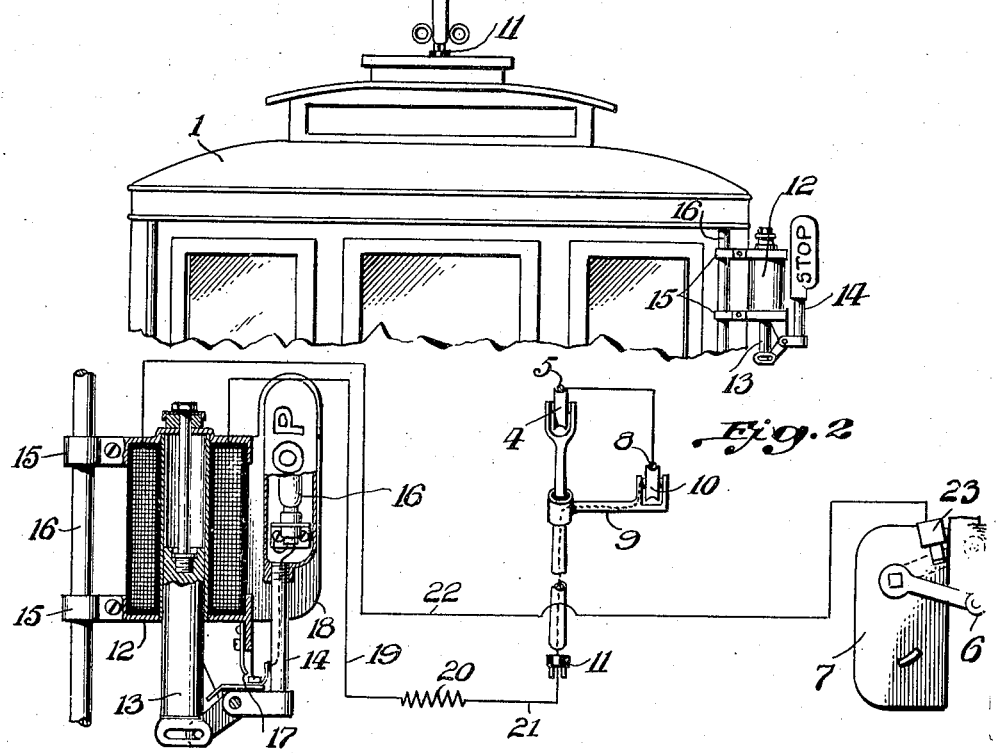
Inventors
Joseph Basil and Frank Girardi
Attorneys

UNITED STATES PATENT OFFICE.

JOSEPH BASIL AND FRANK GIRARDI, OF DETROIT, MICHIGAN.

TROLLEY-SIGNAL.

1,342,579.                    Specification of Letters Patent.        Patented June 8, 1920.

Application filed February 17, 1919. Serial No. 277,536.

*To all whom it may concern:*

Be it known that we, JOSEPH BASIL and FRANK GIRARDI, citizens of the United States of America, residing at Detroit, in the county of Wayne and State of Michigan, have invented certain new and useful Improvements in Trolley-Signals, of which the following is a specification, reference being had therein to the accompanying drawings.

Many city ordinances require automobiles and other vehicles to stop at street crossings, safety zones or stations when cars or trains are being loaded and unloaded, in order that passengers may safely cross the street and safely reach a pavement. It is not always possible for the chauffeur or operator of an automobile to detect when a street car or train is going to stop, so we aim to provide a street car with a semaphore signal which will be automatically operated to indicate to the chauffeur or operator of an automobile that the signal carrying car or train is about to stop, thus giving the chauffeur of the automobile notice to bring his or her car to a standstill. A signal that we may conveniently use for this purpose has been disclosed in Patent No. 1,264,596, dated April 30, 1918, and with this signal we associate a novel trolley equipment and controller switch, so that when the motorman of a street car shuts off the operating current another circuit will be established in connection with the signal to operate the same.

Our improvement will be hereinafter specifically described and then claimed, and reference will now be had to the drawing, wherein—

Figure 1 is a rear elevation of a portion of the street car provided with a signal and trolley equipment in accordance with our invention;

Fig. 2 is a diagrammatic view of our invention, showing the electrical connection between the signal, trolley and controller, and Fig. 3 is a diagrammatic plan of street crossings having an equipment in accordance with our invention.

In the drawing, the reference numeral 1 denotes a street car adapted to travel on a track 2, said car having a trolley pole 3 provided with a trolley wheel 4 adapted to travel on a trolley wire 5. The operation of the car is under the control of a motorman by means of the lever 6 of a controller 7 which is included in the electric operating circuit of the car and the car is stopped by shifting the lever 6 to the dotted position shown in Fig. 2.

The overhead or trolley equipment comprises an auxiliary trolley wire 8 electrically connected to the main trolley wire 5, said auxiliary trolley wire being suitably supported intermediate the intersection of streets, as shown in Fig. 3, and at such points where the operating current of the street car is shut off to stop the car at a street crossing, and these auxiliary trolley wires are provided in order that we may utilize the electric current of the main trolley wire 5 to operate our stop signal.

With this end in view, the trolley pole 3 is provided with a bracket 9 suitably insulated from the pole 3 and said bracket has an auxiliary trolley wheel 10 adapted to engage the auxiliary trolley wire 8. The auxiliary trolley wheel 10 and the bracket 9 are electrically connected, as shown in Fig. 2, to a plug switch 11, carried by the top of the car 1, said plug switch being employed so that the trolley pole 3 can be renewed or removed at will.

On the rear end of the car 1, preferably at the right hand side thereof, is a solenoid operated semaphore signal arm comprising a solenoid 12 having a core 13 connected to a pivoted semaphore arm 14. The solenoid 12 has suitable clamping members 15 so that it may be attached in an upright position to a post or member 16 of the street car 1, and the core 13 is provided with cushioning devices and means to limit the movement thereof. The semaphore arm 14 contains an incandescent lamp 16 and associated with said semaphore arm is a switch 17 so that the incandescent lamp 16 may be illuminated when the semaphore arm is swung downwardly to a horizontal position. When in a vertical position, as shown in Fig. 2, the semaphore arm may be between guards or shields 18 and these guards or shields have been dispensed with in Fig. 1 so as to clearly show the semaphore arm.

The solenoid 12 is connected by a wire 19 to a suitable resistance coil 20 and said coil connected by a wire 21 to the plug switch 11. The solenoid 12 is also connected by a wire 22 to a plunger switch 23 on the controller 7 and in the path of the lever 6, so that when said lever is swung to close the operating circuit of the street car, the plunger switch 23 is actuated to close the electric circuit in connection with the solenoid 12 and thereby energize said solenoid and cause the semaphore arm to be swung to a horizontal active position to indicate that the street car is about to stop.

From the foregoing, it will be observed that the operation of the semaphore arm signal is automatic, does not require any extra attention of the conductor or motorman of the street car. It will be of sufficient notice to the chauffeur or operator of an automobile that the street car is about to stop, and the danger of an automobile running down passengers or pedestrians at a street crossing should be reduced to a minimum.

What we claim is:—

1. In a signal, the combination with a street car provided with a controller having a lever, and a trolley pole adapted to travel on a trolley wire, of an auxiliary wire connected to said trolley wire, a bracket carried by said pole adapted for engagement with said auxiliary wire, a solenoid carried by the rear end of said car and electrically connected to said bracket, a signal arm carried by said solenoid and actuated by said solenoid being energized, and a switch carried by said controller in circuit with said signal and adapted to be actuated by the lever of said controller to complete an operating circuit for said solenoid.

2. The combination set forth in claim 1, and wherein the auxiliary wires are arranged at intervals on the trolley wire, and the switch on said controller disposed to complete an operating circuit for said signal when the operating circuit of the car is shut off by said controller.

3. The combination with a street car provided with a controller, a controller lever, and a means for collecting propulsion current from a power line, of an auxiliary source of current placed at intervals along the path of the street car, means on the car for collecting current from said auxiliary source of current, a switch operated by said controller, and a signal visible from the rear of the car and operatable by the auxiliary source of current when said switch is closed by said controller lever.

In testimony whereof we affix our signatures in presence of two witnesses.

JOSEPH BASIL.
FRANK GIRARDI.

Witnesses:
KARL H. BUTLER,
ANNA M. DORR.